United States Patent [19]
Winston

[11] 4,240,692
[45] Dec. 23, 1980

[54] ENERGY TRANSMISSION

[75] Inventor: Roland Winston, Chicago, Ill.

[73] Assignee: The University of Chicago, Chicago, Ill.

[21] Appl. No.: 641,557

[22] Filed: Dec. 17, 1975

Related U.S. Application Data

[63] Continuation-in-part of Ser. No. 628,383, Nov. 3, 1975, abandoned.

[51] Int. Cl.³ .............................. G02B 5/14; F24J 3/02
[52] U.S. Cl. ................................. 350/96.10; 126/438; 126/441; 350/293; 350/294
[58] Field of Search ...................... 350/96 R, 293, 294, 350/258, 263–265; 126/270, 271, 438, 441; 136/89 PC, 206; 237/1 A

[56] References Cited

U.S. PATENT DOCUMENTS

| 3,437,804 | 4/1969 | Schaefer et al. | 350/96 R |
| 3,467,840 | 9/1969 | Weiner | 350/96 R |
| 3,883,731 | 5/1975 | Morton et al. | 350/96 R |
| 3,899,672 | 8/1975 | Levi-Setti | 350/294 |
| 3,923,381 | 12/1975 | Winston | 350/294 |
| 3,995,935 | 12/1976 | McCartney | 350/293 |

FOREIGN PATENT DOCUMENTS 1472267  12/1969  Fed. Rep. of Germany ........ 350/96 R

OTHER PUBLICATIONS

Light Guide Arrangement with Strong Concentrating Effect by M. Ploke in Optik, No. 1, pp. 31–43, (1967).

*Primary Examiner*—Stewart J. Levy
*Attorney, Agent, or Firm*—Merriam, Marshall & Bicknell

[57] ABSTRACT

Disclosed are radiant energy transmitting devices operative selectively in concentrative and emissive modes, having transmitting elements including radiant energy transmitting and guiding surfaces at the interface of media of differing indices of refraction for radiant energy. Surfaces generally are of a concavely sloping configuration consistent with reflecting, for example, extremal energy rays entering the element from within a defined field of acceptance at an energy inlet onto an energy trap or, in the alternative, extremal rays from an energy source through an energy outlet within a defined field of emission. The energy source or trap is preferably an energy transducer such as a photoelectric device.

24 Claims, 13 Drawing Figures

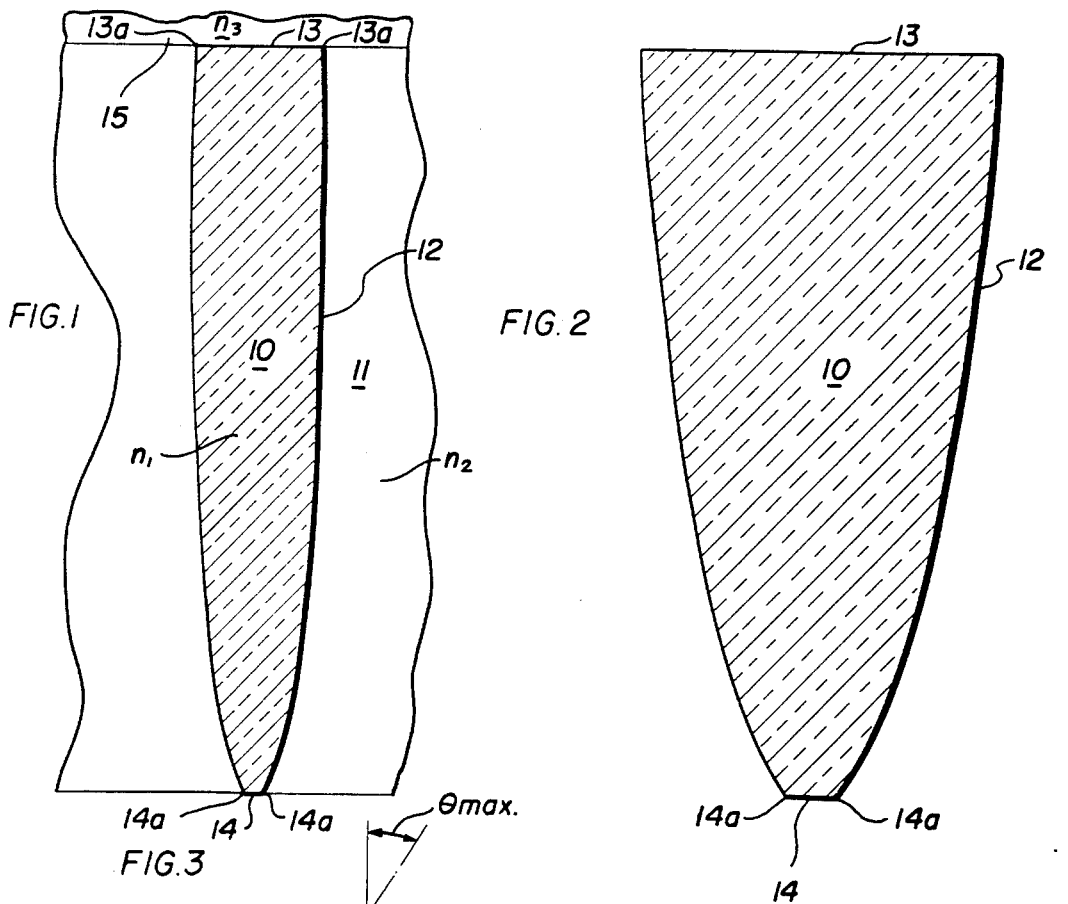
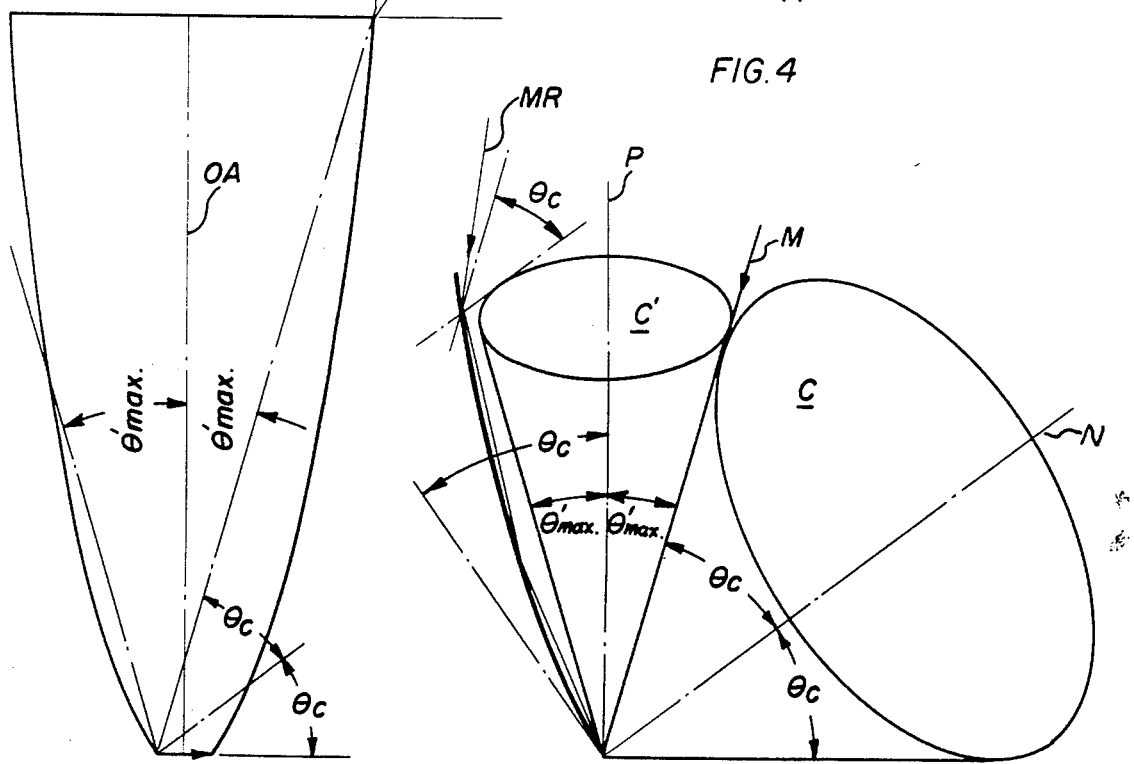

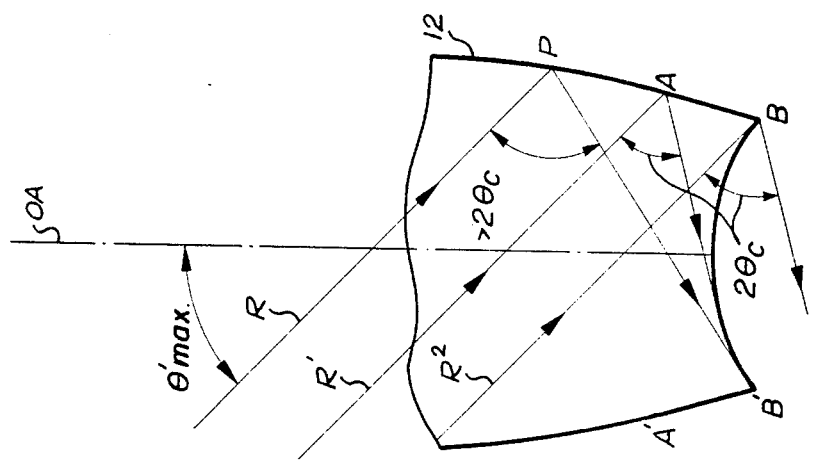
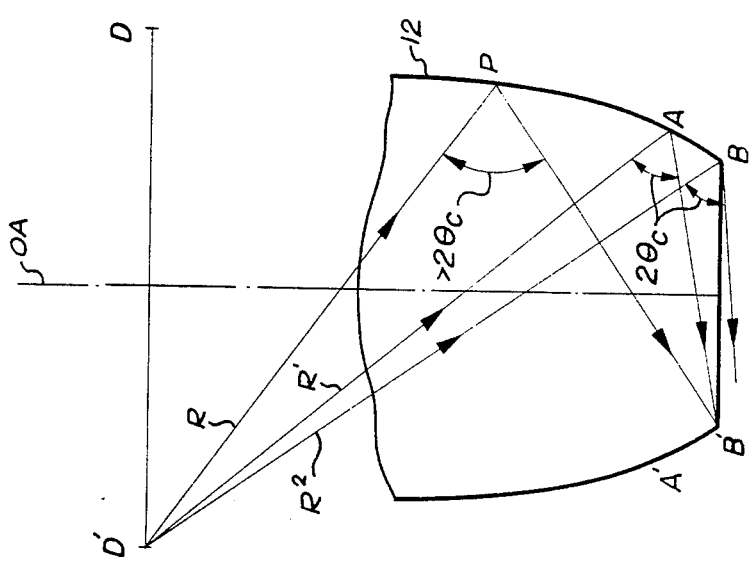
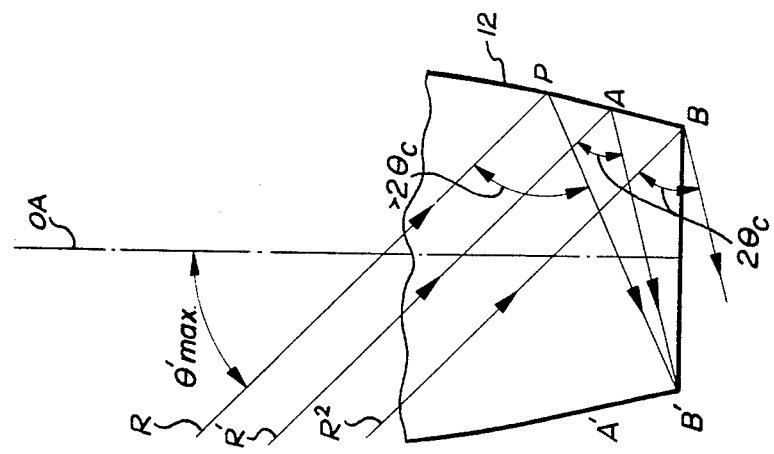

ENERGY TRANSMISSION

CROSS-REFERENCE TO RELATED APPLICATION

This is a continuation-in-part of my co-pending application Ser. No. 628,383 now abandoned, filed Nov. 3, 1975.

BACKGROUND OF THE INVENTION

The present invention relates generally to transmission of radiant energy and more particularly to devices which may be constructed to collect radiant energy from within a field of selected angular characteristics or alternatively to emit radiant energy throughout a field of selected angular characteristics or both. As such, the invention relates to radiant energy concentrative and emissive functions and combinations thereof useful for such purposes as energy display, energy transformation and coupling other energy transmission devices. Devices according to the present invention include radiant energy reflecting and guiding walls developed at the interface of media of differing indices of refraction for radiant energy and optimally operative to substantially provide total internal reflection of such radiant energy.

The prior art has proposed and includes numerous structures and devices for electromagnetic or radiant energy detection, collection, concentration, transmission, transformation, propagation and emission of widely differing forms, including those naturally occurring [e.g., photosensitive "optical" elements in animals as described in J. Opt. Soc. Am., Vol. 61, No. 8, pp. 1120-21 (1971)]; image-forming lenses, fibers and the like; reflective layers and coatings for focusing and scattering; as well as uncoated transparent fibers, light pipes and the like.

Quite frequently devices and systems useful in one mode of energy transmission have for the most part been ineffective or inefficient when operation in an alternative mode has been attempted. Further, technological advances in certain fields of radiant energy transmission have not been matched in advances in necessarily complementary fields. Examples for this state of events are abundant. Photoelectric cells have been produced which have a capacity for converting radiant energy into electrical energy beyond the ordinary capacity of transmission devices to supply operative surfaces of such cells with radiant energy in a manner to make the "trade-off" involved in the energy conversion economically feasible. Similarly, use of reflective (e.g., silvered) layers and mirrored surfaces to focus and/or scatter radiant energy quite often fail in applications involving multiple reflections wherein the relatively "minor" absorptive characteristics of such layers and surfaces are a significant deterrent to efficient transmission. As another example, imaging systems such as lenses and the like which are generally quite efficient in transmitting energy eminating from a fixed source, require a "trade-off" in terms of tracking when the energy source is transient and/or diffused. Energy transmission systems of an internally reflective variety such as light fibers and light pipes quite adequately function in transmission of rays of certain angular origin but may be quite inefficient and "leak" when called into operation for transmission of energy of differing angularity.

Recent proposals for the use of "ideal" radiant energy reflective surfaces developed in substantially trough-like and conical configurations have met with substantial success, especially in applications involving collection and concentration of solar energy. Thus, for example, my U.S. Pat. No. 3,923,381 discloses, inter alia, non-imaging radiant energy collecting and concentrating devices generally including opposed reflective surfaces sloped to reflect the maximum angle energy rays within the device's field of acceptance on an energy trap—allowing concentration by substantial factors, avoidance of transient energy source tracking and general minimization of absorptive losses due to multiple reflections. In a similar manner, U.S. Pat. No. 3,899,672 of Levi-Setti discloses, inter alia, non-imaging conically-shaped energy collectors and concentrators having similarly advantageous energy transmission characteristics. Complimentary disclosures relative to this subject matter are contained in my publications, "Principles Of Solar Concentrators Of A Novel Design," *Solar Energy*, Vol. 16, pp. 89-95 (1974) and *Solar Energy Concentrations, Progress Report* NSF/RANN AER 75-01065 (February, 1975), the latter of which specifically relates to principles for maximally concentrating radiant energy onto a tube receiver through use of cylindrical trough-like reflecting wall light channels of specific shape which concentrate radiant energy by the maximum amount allowed by phase space conservation.

To the extent that my said U.S. Pat. Nos. 3,923,381, 3,899,672, my recent publications, "Principles Of Solar Concentrators Of A Novel Design, " *Solar Energy*, Vol. 16, pp. 89-95 (1974) and *Solar Energy Concentration, Progress Reports* NSF/RANN AER 75-01065 (February and July, 1975) contain "essential material" necessary to support the claims hereof or provide statutorily adequate disclosure or "non-essential subject matter" indicating the background of the invention and/or illustrating the state of the art, the disclosures thereof are expressly incorporated by reference herein.

Also specifically incorporated by reference herein for purposes of indicating the background of the invention and/or the state of the art are the following patents and publications: Tabor, *Solar Energy*, Vol. II, No. 3-4, pp. 27 et seq. (1958); Sleeper, U.S. Pat. No. 3,125,091; Meinel et al., *Physics Today*, Vol. 25, pp. 684 et seq. (1972); Falbel, U.S. Pat. No. 3,179,105; Hintenberger and Winston, *Rev. Scientific Instruments*, Vol. 37, No. 8, pp. 1094-95 (1966); Hintenberger and Winston, *Rev. Scientific Instruments*, Vol. 39, No. 8, pp. 1217-18 (1968); Winston, *J. Opt. Soc. Am.*, Vol. 60, No. 2, pp. 245-47 (1070); Winston, *J. Opt. Soc. Am.*, Vol. 61, No. 8, pp. 1120-21 (1971); Williamson, *J. Opt. Soc. Am.*, Vol. 42, No. 10, pp. 712-15 (1952); Witte, *Infrared Physics*, Vol. 5, pp. 179-85 (1965); Emmett, U.S. Pat. No. 980,505; Baranov, et al., *Soviet Journal of Optical Technology*, Vol. 33, No. 5, pp. 408-11 (1966); Baranov, *Soviet Journal of Optical Technology*, Vol. 34, No. 1, pp. 67-70 (1967); Baranov, *Applied Solar Energy*, Vol. 2, No. 3, pp. 9-12 (1968); Newton, U.S. Pat. No. 2,969,788; Phillips, et al., U.S. Pat. No. 2,971,083; Florence, U.S. Pat. No. 3,591,798; U.S.S.R. Certificate of Authorship No. 167,327 to V. K. Baranov, published on Jan. 4 and Mar. 18, 1965; U.S.S.R. Certificate of Authorship No. 200,530 to V. K. Baranov, published on Aug. 15 and Oct. 31, 1967; Perlmutter, et al., U.S. Pat. No. 3,229,682; Perlmutter, et al., *Journal of Heat Transfer*, August, 1963, pp. 282-83; Winston, et al., *Solar Energy*, Vol. 17, No. 4, pp. 255-58 (1975).

BRIEF DESCRIPTION

According to the present invention apparatus is provided for use in an external radiant energy transmitting medium and selectively constructed for operation in concentrative and emissive modes. The structures are of a configuration generally corresponding to those disclosed for use in energy concentration and now commonly referred to as Compound Parabolic Concentrator (CPC) structures [See, e.g., "Solar Heating and Cooling: Engineering, Practical Design and Economics", J. F. Kreider and F. Kreith, McGraw-Hill, New York (1975) pp. 98-101].

For CPC-type devices "filled" with energy transmitting media one would a priori expect that, due to the wide variation of internal angles of energy ray incidence with the reflective wall, only a fraction of all rays would be totally reflected in the absence of an externally applied reflective coating. The present invention demonstrates the unexpected circumstance that the conditions requisite for total internal reflectivity and for construction of CPC-type devices co-exist for cases of considerable practical importance. Apparatus of the invention includes, in broad aspect, radiant energy transmitting structures of generally trough-like (cylindrical) or conical shape. The structures include a radiant energy inlet (or outlet) which participates in establishing a field of acceptance (or emission) and energy reflecting and guiding walls generated at and/or by the interface between the external medium and a medium internal of or to the structures. The structures are utilized in combination with a radiant energy trap (or source). The energy reflective walls of the structures are generally concavely sloping in a manner optimally consistent with permitting certain extremal rays, characterized by reference to the field of acceptance (or emission) to reach or emanate from the energy trap or source.

As employed herein, the terms "extremal" has the meaning ordinarily attributable to the term "extreme" but also includes the meaning given to the term in the art of the calculus of variations wherein a function is called an "extremal" when it is a solution to the variational problem under consideration.

Comprehended by the invention are symmetric and asymmetric transmitting structures combined with energy traps or sources both disposed internally and externally of the reflective walls.

Structures of particular interest according to the present invention include those wherein the ratio of refractive indices of internal to external media is in excess of the square root of 2. Also comprehended are transmitting structures substantially totally internally reflective with respect to energy rays of angular interest as well as structures with respect to which "remedial" features (such as optical coupling with reflective coatings or remedial sloping of reflective wall portions) are provided to assist in the functional approximation of substantial total internal reflectivity.

Further aspects and advantages of the present invention will become apparent upon consideration of the following description thereof, reference being made to the drawing.

BRIEF DESCRIPTION OF THE DRAWING

FIG. 1 is a transverse sectional view of a radiant energy transmitting element of the invention within a radiant energy transmitting medium;

FIG. 2 illustrates the lower one quarter portion of the radiant energy transmitting element of FIG. 1;

FIG. 3 is a schematic cross-sectional view of another embodiment of a radiant energy transmitting element of the invention;

FIG. 4 is a graphic representation of certain operative characteristics of a radiant energy transmitting element as in FIG. 3;

FIG. 11 is a schematic cross-sectional view of an embodiment of the invention illustrating remedial shaping of reflective surfaces consistent with maximal concentration and total internal reflection;

FIG. 12 is a schematic cross-sectional view of an embodiment of the invention illustrating remedial shaping of reflective surfaces consistent with maximal concentration and total internal reflection as particularly applicable in concentrative operation for a fixed-distance source of radiant energy;

FIG. 13 is a schematic cross-sectional view of an embodiment of the invention illustrating remedial shaping of reflective surfaces consistent with maximal concentration and total internal reflection as particularly applicable to use of a tubular radiant energy source or trap.

DETAILED DESCRIPTION

Figure 5:
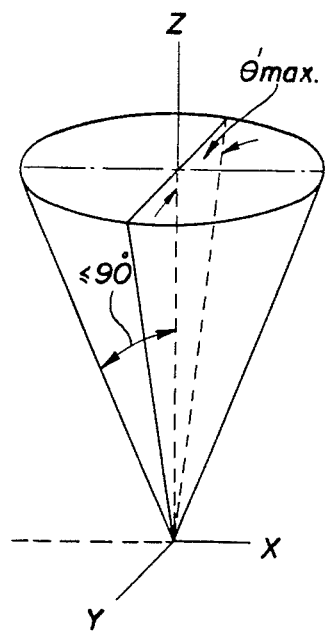
FIG. 5 is a further graphic representation of certain operative characteristics illustrated in FIG. 4.

In view of bimodal operative capabilities of apparatus according to the present invention, the following detailed description shall refer for convenience of understanding to operational characteristics applicable to use in radiant energy collection and concentration modes although these same operational characteristics, generally directionally reversed, are applicable to use in emissive modes. Thus, reference to radiant energy "concentrators" shall include reference to "emitters" and bimodally operative (e.g., retroreflective) devices unless otherwise expressly indicated. In keeping with this format, for example, reference to an "inlet" in the course of description of concentrative apparatus shall include reference to an "outlet" for emissive structures.

As used herein and in the claims, the term "energy trap" shall mean and include any apparatus or material having the capacity for detection, utilization and/or further transmission of radiant energy. As such, the term includes, but is not limited to, such radiant energy conversion devices or transducers as photoelectric cells. As used herein and in the claims, the term "energy source" shall mean and include any apparatus or material having the capacity to emit or re-emit (e.g., by reflection) radiant energy. As such, the term includes, but is not limited to, such devices as light emitting diodes and mirrors.

FIG. 1 illustrates in cross-section an embodiment of a concentrative radiant energy transmission element 10 for use in an external radiant energy transmitting medium 11. As shown, element 10 consists at least in pertinent part of a material which itself is an energy transmitting medium having an index of refraction, $n_1$, and external medium 11 consists of a substance having an index of refraction, $n_2$. According to well-known principles of fiber optics, in those situations wherein $n_1$ and $n_2$ are unequal, there is formed or generated at the interface of these media an optically reflective wall or surface 12. In the embodiment illustrated, where $n_1$ is greater than $n_2$, the surface 12 is consequently reflective for energy impinging thereon from within element 10. Alternatively stated, wall or surface 12 provides internal reflectivity for and within transmission element 10.

The particular embodiment of FIG. 1 illustrates an energy transmitting element of a configuration generally conforming to (CPC) structures useful in energy concentration. Viewed in consideration of known CPC construction formulations, surface 12 is seen to "originate" at, and at least in part define, a radiant energy inlet 13 and also to "terminate" at and similarly define a radiant energy outlet 14 (optimally co-planar with inlet 13). Energy inlet 13 is in optical contact with radiant energy transmitting medium 15 having an index of refraction $(n_3)$ which may be the same or different as $n_1$ and/or $n_2$. The profile curve reveals a pair of opposed reflective walls or surfaces 12 generally parabolically concavely sloped to assume the maximum possible slope consistent with reflecting through or onto the energy outlet 14 (having an energy trap operatively associated therewith) the extremal energy rays which enter the energy inlet from within the field of acceptance of the CPC structure.

Other general characteristics of CPC configurations are equally applicable to the embodiment of FIG. 1. Structures of this type, for example, generally have a well defined field of acceptance for radiant energy, an angular acceptance, $\theta_{max}$, for such energy within such field determinable with respect to the energy inlet, and, depending upon the particular embodiment employed, an optical axis determinable by reference to distances separating opposed "edge" portions of the energy inlet 13 and outlet 14 (designated 13a, 13a and 14a, 14a respectively). Similarly, the ratio of transverse dimensions of the outlet 14 and inlet 13 of the embodiment is preferably not less than the sine of the angular acceptance of the CPC structure. The parabolic curvature of the reflective wall 12 has as its focus the opposing "edge" of the energy outlet 14 and as its axis a line forming an angle with the optical axis equal to the angular accpetance, $\theta_{max}$. The overall height of the embodiment is preferably equal to half the product of the sum of the transverse dimensions of inlet 13 and outlet 14 multiplied by the cotangent of the angular acceptance, $\theta_{max}$. Clearly some substantial truncation of the concentrator may be made for practical (i.e., ease of fabrication) purposes with corresponding loss of concentrative capacity though without diminution of angular acceptance. Similarly, the effective energy inlet may be "extended" or "relocated" by linearly extending wall 12 parallely to the optic axis without substantial alteration of the angular acceptance of the concentrator element.

For clarity, all indices of refraction have been assumed to be identical in the immediately preceding discussion.

The geometric relationships illustrated in FIG. 1 are exposed with somewhat greater clarity in FIG. 2 wherein only the lower one quarter portion of the 6° $\theta_{max}$ CPC-type structure has been shown.

Figure 6:
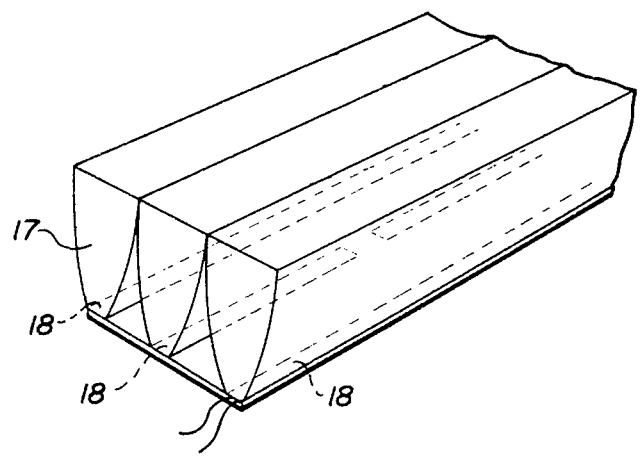
FIG. 6 is an illustrative array of radiant energy transmitting elements of the invention operable in either concentrative or emissive modes.
Figure 7:
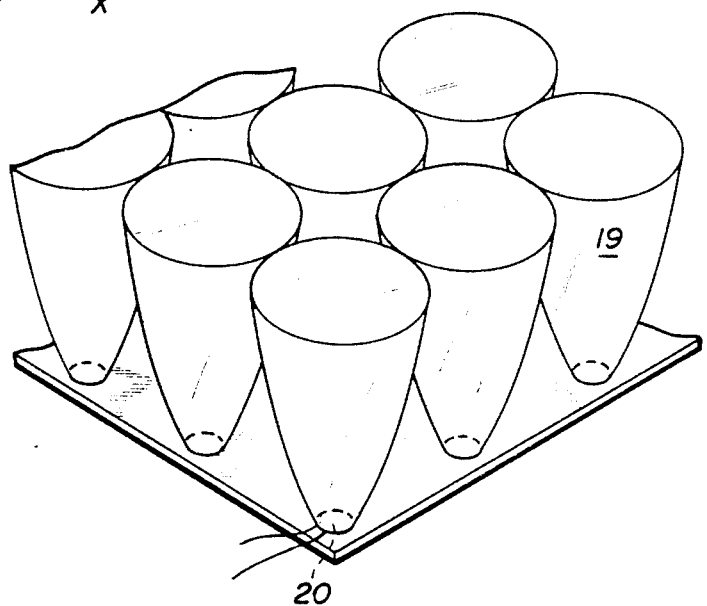
FIG. 7 is an illustrative array of alternative embodiments of radiant energy transmitting elements of the invention operable in either concentrative or emissive modes.
Figure 8:
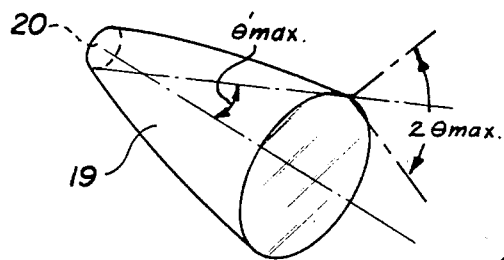
FIG. 8 is a perspective view of a single radiant energy transmitting element of the invention illustrating operation in a emissive and/or concentrative modes.

Clearly, relationships shown in the cross-sectional views represented by FIGS. 1 and 2 are equally applicable to trough-shaped concentrators (see, e.g. FIGS. 6 and 9) as well as to conically-shaped concentrators (see, e.g. FIGS. 7 and 8).

It should be additionally noted that the following description of operative characteristics of trough-shaped CPC-like structures of the variety illustrated in FIGS. 1 through 6 and 9 are equally applicable to variant embodiments of ideal cylindrical collectors of trough-like configuration (e.g. FIGS. 10 and 13) wherein, for example, radiant energy is maximally concentrated onto a receiver 16 tubular in general shape (including inter alia, those having an elliptical, circular or oval cross-section) and wherein the receiver is generally disposed within the concentrator 10 and/or between reflective wall elements 12, 12 of the concentrator.

The CPC-type structures in both trough-like and cone geometries generally can achieve a concentration ratio, x, according to the following.

$$x = n/\sin \theta_{max} \text{ (trough)}, \quad (1)$$

$$x = n^2/\sin^2 \theta_{max} \text{ (cone)}, \quad (2)$$

where $\theta_{max}$ is the angular acceptance (half angle) and n is the index of refraction of the collector relative to the medium at the energy inlet. Where the trough or cone is air-filled and the inlet is in contact with air, n=1. This concentration ratio is believed to be the maximum permissible by physical principles.

According to the present invention it has been determined that for certain values of parameters of considerable practical importance, the interface between a medium internal to a CPC-type structure's walls and that surrounding (and optically coupled to) the structure's walls provides a substantially perfect total internally reflective surface which prevents or minimizes leakage of radiation, thereby obviating the need for e.g., a metallic reflective coating to provide for energy guiding and reflecting.

Where the internal medium of element 10 has a refractive index $(n_1)$ in excess of the refractive index $(n_2)$ of the external media 11 and 13 (i.e., $n_2 = n_3$) in contact therewith, incident rays which lie within the angular acceptance $(\theta_{max})$ of a trough-shaped CPC-type structure are refracted into an elliptic cone of semi-minor angle $\theta'_{max}$ and semi-major angle $\theta_c$ where $$n = n_1/n_2 = \text{relative refractive index} \quad (3)$$

$$\sin \theta'_{max} = (1/n) \sin \theta_{max}, \text{ and} \quad (4)$$

$$\theta_c = \arcsin (1/n), \text{ the critical angle.} \quad (5)$$

For the cone-shaped CPC-type structures the angular range is simply a cone of half angle $\theta'_{max}$.

These rays are funnelled to the exit aperture after perhaps one or more reflections. In order for a ray to undergo total internal reflection at the wall, it must lie outside the critical cone of half angle $\theta_c$. For the trough and perhaps also the cone, the severest test of this condition occurs for the extreme meridional ray incident on the exit edge of the reflecting wall (see FIG. 4). Then, the condition becomes $$\sin \theta'_{max} \leq (1 - 2/n^2) \quad (6)$$

so that $$\sin \theta_{max} \geq n(1 - 2/n^2) \quad (7)$$

$$x_{max} = 1/(1 - 2/n^2) \text{ (trough)} \quad (8)$$

$$x_{max} = 1/(1 - 2/n^2)^2 \text{ (cone)} \quad (9)$$

Notice that at sine $\theta_{max} = 1$, equation 7 has the solution $n \geq 2$, so that $n = 2$ achieves a full 180° field of view. Alternatively where $n = \sqrt{2}$ a field of view approaching 0 is achieved.

These relationships will be better understood through consideration of FIGS. 3, 4 and 5. FIG. 3 illustrates a cross-sectional view of a CPC-type structure (of either trough-like or conical geometry) according to the invention wherein $\theta'_{max}$, the angular acceptance within the medium filling the concentrator, is approximately 17.94°1. (Note that for ease of illustration and demonstration the following are assumed: that the medium filling the concentrator element 10 is uniform throughout; and that the medium 11 external to wall or surface 12 is of identical refractive index to that medium 15 in optical contact with energy inlet 13, i.e., that $n_2 = n_3$). Line OA designates the optical axis of the element. $\theta_c$ is the critical angle, measured with respect to the normal N to the interface surface. Radiation impinging at angles greater than or equal to $\theta_c$ is consequently totally internally reflected.

Application of this property is illustrated in FIG. 4 wherein M represents the extreme meridional ray above-discussed. For either trough-shaped or conical CPC-type concentrators, radiant energy impinging upon point 14a outside of the cone C defined by axis N and half angle $\theta_c$ is totally internally reflected. It is therefore seen that any ray impinging from within the field of acceptacne (within cone C') is reflected toward or through outlet 14. For a CPC-type concentrator of conical geometry, cone C' is a right circular cone having as its axis line P, parallel to the optic axis and a half angle equal to $\theta'_{max}$. For a CPC-type concentrator of trough-like geometry, cone C' is as represented in FIG. 5, i.e., an elliptic cone having as its semi-minor angle $\theta'_{max}$ and as its semi-major angle $\theta_c$. [Note, for example, that if inlet 13 is in optical contact with a medium 15 differing in refractive index from that in contact with surface 12, (i.e., $n_3 \neq n_2$) the semi-major angle of cone C' may vary and approach 90°.]

Having satisfied the total internal reflection condition at point 14a, it is apparent that this condition is also met at points along wall 12 closer to the inlet. Multiple reflections in CPC-type trough-shaped concentrators, including those of skew rays, will occur only off the same wall and obviously satisfy the condition (see, e.g., rays illustrated along line MR). Multiple reflections of meridional rays in a CPC-type conical concentrator also occur only off the same wall profile and similarly satisfy the condition. Skew rays in a CPC-type conical collector are obviously seen to satisfy the total internal reflection condition up to and including two reflections. A ray trace reveals that all skew rays, irrespective of the number of reflections are substantially internally reflected.

According to the relationships above-described, if the $\theta'_{max} = 17.94°$ structure of FIG. 3 were of a trough-shaped CPC-type, filled with a uniform medium wherein $n_1 = 1.7$, and in optical contact with air ($n_2 = 1$) both at wall 12 and at inlet 13 (i.e., $n_3 = n_2$), then $\theta_{max}$ (the angular acceptance of the concentrator element) would be equal to 31.57° and the concentration capability would be up to 3.25.

Table 1, following, graphically provides certain relationships for trough-shaped CPC-type concentrators of varying parameters.

TABLE 1

| n* | $\theta'_{max}$ | $\theta_{max}$ | Concentration** |
|---|---|---|---|
| $\sqrt{2}$ | ~0 | ~0 | ~∞ |
| 1.5 | 6.38 | 9.59 | 9.00 |
| 1.6 | 12.64 | 20.49 | 4.37 |
| 1.7 | 17.94 | 31.57 | 3.25 |
| 1.8 | 22.50 | 43.54 | 2.61 |
| 1.9 | 26.49 | 57.93 | 2.24 |
| 2.0 | 30.00 | 90.00 | 2.00 |

*n = $n_1/n_2$ = relative refractive index
**Concentration = $1/\sin \theta'_{max}$ The concentration capability of CPC-type conical concentrators will, of course, approach $1/(\sin \theta'_{max})^2$ as opposed to $1/\sin \theta'_{max}$ for troughs.

When an index of refraction ratio $n > 2$ is available, it is possible to increase the concentration by lowering $\theta'_{max}$ below at 30° while maintaining the $\theta_{max} = 90°$ acceptance condition. (In infrared applications energy transmitting materials commonly have indices of refraction in excess of 2.)

The relationships set out in Table 1 represent the largest angular acceptances obtainable for particular values of the variable n when the range of its values is from $\sqrt{2}$ to 2, which varies almost serendipitously correspond quite well to the indices of refraction of most "transparent" solids relative to the refractivity of air. Clearly, configurations employing smaller values of $\theta'_{max}$ may be constructed with resultant enhancement of concentrative capability and, of course, without loss of the total internal reflective capability. Thus, for example, a trough-shaped CPC-type concentrator filled with an acrylic plastic medium having $n \sim 1.5$ (where medium 11 is air) may be constructed to assume a value of $\theta'_{max}$ of 3°, in which case $\theta_{max} = 4.5°$ and the maximum concentrative capability approaches 19.00. In a like manner, through use of a glass-filled ($n \sim 1.6$) a concentrator with $\theta'_{max} = 6.00°$ will result in $\theta_{max} = 9.63°$ and provide a maximum concentrative capability of about 9.57. Note that these values indicate an exceptional flexibility in constructing transmission elements for solar energy concentration without diurnal tracking.

For the case wherein the medium 15 in optical contact with the energy inlet 13 has a different index of refraction from that in contact with and surrounding wall 12 ($n_3 \neq n_2$), all previous statements of relationships apply, with the modification that $\theta_{max}$ should be computed in accordance with the following:

$$\sin \theta_{max} = (n_1/n_3) \sin \theta'_{max} \quad (10)$$

For those cases wherein the medium filling concentrator 10 is non-uniform, adjustments in angular properties consistent with known theories of fiber optics will apply.

For a CPC-type trough-like concentrator, the end walls are generally constructed perpendicular to the entrance plane. Since rays entering the medium are restricted in angle up to $\theta_c$, the maximum angle of incidence on the end wall will be $90°-\theta_c$ which is $\geq \theta_c$ (the condition for total internal reflection) for $\theta_c \leq 45°$. This requires $n \geq \sqrt{2}$ which coincides with the condition (Equation 7) required to make the trough operative by total internal reflection. For the condition $\theta_c < 45°$, the end walls may be sloped to achieve some additional concentration while maintaining total internal reflectivity.

Figure 10:
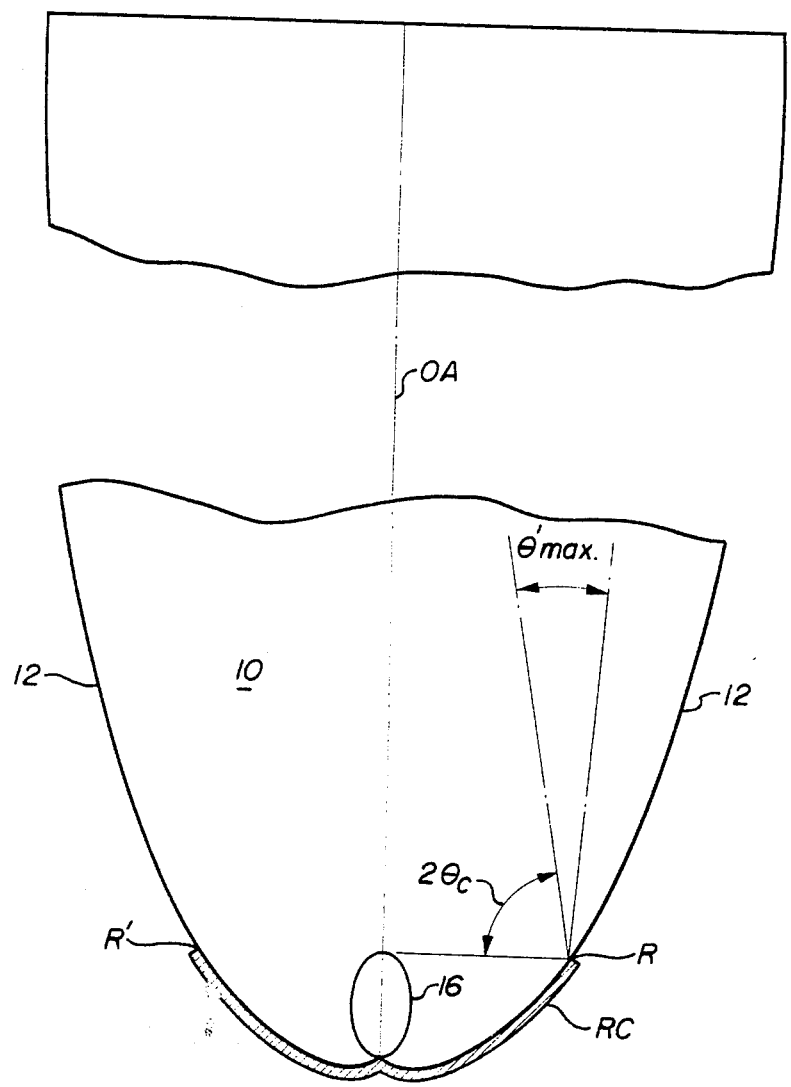
FIG. 10 is a sectional view of a cylindrical trough-like channel of the invention constructed for maximal concentration of radiant energy onto a tubular energy receiver or trap and illustrating remedial reflective coating.

FIG. 10 illustrates a cylindrical trough-like channel specifically constructed for maximal concentration of radiant energy onto a tubular receiver or energy trap. As earlier noted, remedial optical coupling with a reflective coating RC along a portion of wall 12 will assist in functional approximation of total internal reflectivity for the structure, specifically, below the points R, R' wherein the maximum angle ray is incident on wall 12 at angles less than or equal to the critical angle, $\theta_c$. For selected indices of refraction, points R, R' may be at the level or even below the "uppermost" portion of the receiver 16. Where, for example the relationships of Table 1 are applied, R, R' will lie in a plane at said level.

From the above discussion it is clear that energy-transmitting-medium "filled" devices may be made according to standard CPC-type designs by constructing the profile curve of the reflecting surface to take on the maximum possible slope consistent with reflecting onto a selected energy trap the extremal rays which enter the energy inlet with the field of acceptance of the device.

Devices constructed to accommodate use of media (surrounding and internal) such that $\sqrt{2} \leq n < 2$ will involve shaping of the reflective surface profile curve as illustrated in FIGS. 1-4 and 10, e.g., shaping to provide such a parabolic or functionally equivalent profile curve as may be appropriate to the functional nature and/or geometric configuration of the energy trap and to the relative distance of the energy source. Where such a range ($\sqrt{2} \leq n < 2$) of relative indices of refraction for media is unobtainable or merely undesired—as may be the case where the relation of n to the optimal field of acceptance for a given purpose is not particularly well suited for a desired use—certain modifications of the profile curve are appropriate to an extent that is consistent with maintaining substantial total internal reflectivity. Specifically, the profile curve is generated in a manner illustrated by FIGS. 11, 12 and 13 to provide the maximum possible slope consistent with both substantial total internal reflectivity (requiring that the included angle between an extremal ray and its reflection from the reflective wall be not less than $2\theta_c$) and maintenance of optimal concentration of energy from within the desired range of angularity of origin. Generating the maximum slope according to the CPC prescription is tantamount to providing the minimum included angle consistent with reflecting the extremal ray onto the energy trap. The requirement of total internal reflectivity imposes a lower limit of $2\theta_c$ to this included angle which may override the standard CPC slope prescription and require a remedial prescription sloping along a portion of the reflective wall.

Throughout FIGS. 11-13, for ease of illustration, $\theta'_{max}$ is shown as 45° even though this condition is only met if $n_1/n_3 < \sqrt{2}$.

FIG. 11 illustrates generally the application of the above "remedial prescription" to construction of a concentrator element wherein the energy trap, designated B-B', is geometrically flat (e.g., where the trap is a flat photoelectric energy transducer or involves the use of an opening into a cavity) and wherein energy of interest effectively emanates from an infinitely distant source. In the case illustrated, an energy ray, R, impinging at an angle greater than $\theta_c$ at a point P of parabolically sloped (focus B') reflective wall 12 will, as expected, invariably reach the trap because the included angle is greater than $2\theta_c$. The extremal energy rays $R^1$ or $R^2$ impinging respectively on points A and B at an angle equal to $\theta_c$, would not be totally reflected onto the trap by a parabolic slope if it were continued beyond (illustratively, above) point A. Hence, the remedial step of constructing the profile curve segments A-B, A'-B', of wall 12 to have a straight slope may be made to insure that any such extremal ray invariably reaches the trap. The overall slope of wall 12 is thus seen to consist of more than one simple geometric curve, i.e., it is a parabolic slope smoothly joined to a straight slope. Note that this construction preserves the desired relation of internal reflectivity and optimal concentration within selected angles through the practice of sloping reflective surface 12 to assume the maximal possible slope consistent with reflecting onto the energy trap the extremal energy rays entering the energy inlet from within the concentrator's field of acceptance.

For straight slope angle $\alpha$, revealed in a "remedied" profile curve, geometric analysis shows that the maximum angle of incidence on the flat receiver (in the transverse plane) is $\theta'_{max} + 2\alpha$. This fact is useful in designing a totally internally reflecting CPC-type collector which permits the radiation to substantially emerge from a flat receiver. If, for example, the index of refraction outside the receiver is the same as external to the wall 12 and if $\theta'_{max} + 2\alpha = \theta_c$, then the radiation will substantially emerge. To have total internal reflection along the sloped wall, we require $\theta_c \leq 90° - (\alpha + \theta'_{max})$. Therefore, as long as $\theta'_{max} \leq 180° - 3\theta_c$ this design is operative. The maximum concentration achieved is (sin $\theta_c$/sin $\theta'_{max}$). If $n_3 = n_2$, then sin $\theta_{max} = n$ sin $\theta'_{max}$ and sin $\theta_c = 1/n$, so that the concentration achieved is $1/\sin \theta_{max}$ which is the same as for a non-filled CPC collector.

FIG. 12 illustrates application of the "remedial prescription" to a concentrator element also having a geometrically flat energy trap, B-B', but constructed for use in situations wherein the energy rays of interest emanate from a source, designated D-D', at a fixed distance from the concentrator. Once again, energy ray, R, impinging at an angle greater than $\theta_c$ and reflected at point P of elliptically sloped (foci D', B') reflective wall 12 will invariably reach the trap. Extremal rays $R^1$ and $R^2$, impinging on points A and B at an angle equal to $\theta_c$ would not be totally reflected onto the trap by the elliptical slope if continued beyond point A. Hence the remedial step of constructing the profile curve segments A-B, A'-B', of wall 12 to have a slope in the shape of the arc of an equiangular spiral.

FIG. 13 illustrates application of the "remedial prescription" to construction of a concentrator element wherein the energy trap is tubular, designated by arc B-B', and wherein energy effectively emanates from an infinitely distant source. Once again, energy ray, R, impinging at an angle greater than $\theta_c$ at point P on reflective wall 12 (sloped, at least in part, according to the standard CPC-configuration dictated by the tubular geometry of the trap) will be reflected onto the trap B-B'. Extremal energy rays $R^1$ and $R^2$, impinging at points A and B at an angle equal to $\theta_c$, would not be totally reflected onto the trap if the standard curvature were continued beyond point A. Hence the remedial step of contructing the profile curve segments A-B, A'-B', of wall 12 to have a straight slope may be made to insure that extremal rays invariably reach the trap.

While not illustrated, the remedial sloping required to substantially insure total internal reflectivity for a concentrator associated with a tubular energy trap and constructed to collect light emanating from a fixed-distance source is clear. The reflective wall would be constructed to have the slope of an arc of an equiangular spiral in the portion of the profile curve requiring remedial construction to accommodate extremal rays.

In all of the above examples, the portion of the reflective wall requiring remedial action may follow the standard CPC slope prescription and be "remedied" through use of a reflective coating. It is thus evident that FIGS. 10 and 13 illustrate alternative modes of remedial construction.

The following is an exemplary application of the remedial sloping constructions illustrated in FIGS. 11-13.

If, for example, a concentrator as in FIG. 11 were filled with the polymeric substance triethoxy-silicol methacrylate medium ($n_1 = 1.436$ or effectively 1.4 for the purposes of this example) and immersed in a polymeric vinyl carbazole ($n_2 = 1.683$ or effectively 1.7 for the purposes of this example) then, according to equation (5) above, $\theta_c = 55°$—an apparently problematic situation with respect to application of standard CPC prescriptions because $n < \sqrt{2}$—requiring remedial sloping of the concentrator reflective wall. Elementary geometric analysis reveals that, where it is desired that $\theta'_{max}$ be 15°, the slope of the straight line segment A-B of FIG. 11 will be $\alpha = 90° - (\theta_c + \theta'_{max}) = 90° - (55° + 15°) = 20°$ from the optic axis. The maximum obtainable concentration for a trough-shaped CPC-type concentrator so remedially sloped to preserve substantial total internal reflectivity is $\sin(2\alpha + \theta'_{max})/\sin \theta'_{max} = \sin 55°/\sin 15° = 3.16$. The concentration obtainable for a remedially sloped concentrator of conical geometry would be 10. This concentration is, of course, less than theoretically attainable by an "unremedied" CPC-type trough or cone but preserves total internal reflectivity.

As another example, where $n > \sqrt{2}$ but the standard CPC prescription limits $\theta'_{max}$ (e.g., as in Table I) to an undesired value, remedial sloping may be employed to accommodate a larger value of $\theta'_{max}$ in the manner described above.

Figure 9:
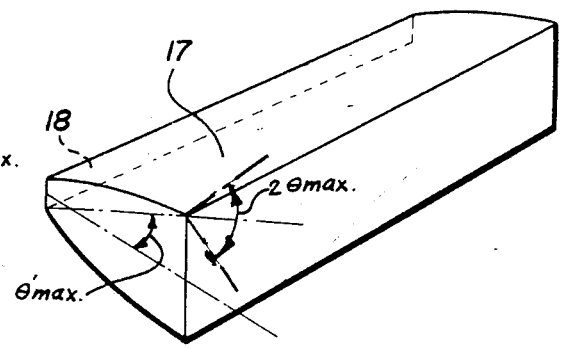
FIG. 9 is a perspective view of an alternative embodiment of a radiant energy transmitting element illustrating operation in a emissive and/or concentrative modes.

FIGS. 6 and 7 illustrate arrays of CPC-type energy transmission elements of the invention in combination with radiant energy sources or trap devices, single transmission elements of which are illustrated in FIGS. 9 and 8, respectively. In FIG. 6 trough-shape elements 17 are aligned to extend longitudinally and may for concentrative use have disposed at their outlets energy traps of energy transducer 18 (e.g., photocell) variety in single or multiple ribbon-like form. In a like manner, the conically-shaped transmission elements 19 of FIG. 7 may have substantially circular photocells 20 at their energy outlets. Alternatively, the arrays of FIGS. 6 and 7 may be employed in an emissive mode, with energy sources such as light emitting diodes in place of energy traps 18, 20. Notably an array of small conical-shaped transmission elements as in FIG. 9 would be expected to be quite useful in numerical display wherein selective actuation of light emitting diodes of low light intensity would generate a pattern having sharp angular properties.

The following Example illustrates operation of apparatus according to the present invention.

EXAMPLE 1

A prototype array of two radiant energy concentration elements (of a configuration as illustrated in FIG. 6) in combination with photocells was constructed. Each concentrator element had substantially uniform internal medium of acrylic plastic ($n_1 = 1.5$) and was surrounded at its reflective side walls and energy inlet by air ($n_2 = 1$). Each element was approximately 7 inches long and 0.6 inch high; the transverse dimension of the inlet was 0.4765 inch; the transverse dimension of the outlet was 0.10 inch; and the transverse dimension of the silicon photocells was 0.085 inch. Calculated $\theta'_{max}$ was equal to 7.18°. Calculated $\theta_{max}$ was equal to 10.8°.

The array of concentrators was exposed to a quartz/halogen light source of one "sun" in magnitude (as measured with a calibrated standard solar cell positioned adjacent the array's inlet) and resulted in a measured gain in cell output of 3.97. (The geometric gain corresponded to 4.05 and thus the prototype system operated at an efficiency of about 98% of geometric.) A more graphic illustration of the prototype array was provided by its observed capacity to actuate an AM/FM radio upon illumination by a light source of approximately ¼ sun.

Obviously many variant applications for apparatus according to the present invention apart from their projected use in solar energy transmission will occur to those ordinarily skilled in the art. As one example, a retroreflecting screen or sign with a sharp angular cut-off in acceptance and emission may be fabricated using trough-shape or conical elements provided with a reflective material optically coupled to the effective enrergy "outlet". As another example, highway directional signs may be constructed which are geared specifically to emit or reflect light beams to an auto driver within a well defined directional field. Therefore, only such limitations as appear in the appended claims should be applied thereto.

What is claimed is:

1. Radiant energy transmission apparatus for use in an external radiant energy transmitting medium and operative in a concentrating mode, said apparatus comprising, transmission means including:
   (a) substantially concavely sloping radiant energy reflective wall means for guiding radiant energy, said wall means comprising means defining an energy inlet,
   (b) means, including said energy inlet, for defining a field of acceptance for radiant energy, and
   (c) a radiant energy refractive internal medium, said reflective wall means comprising an interface between said refractive internal medium and said external radiant energy transmitting medium, and said internal medium having a higher index of refraction for radiant energy then said external medium;

and radiant energy trap means operatively associated with said reflective wall means for receiving radiant energy guided by said wall means;

said concavely sloping reflective wall means having a profile curve sloped to assume the maximum possible slope consistent with totally internally reflecting onto said energy trap means the extremal energy rays which enter said energy inlet within said field of acceptance.

2. Apparatus according to claim 1 wherein said refractive internal medium is of substantially uniform refractive index.

3. Apparatus according to claim 1 wherein the ratio of the refractive index of said internal medium to said external medium is at least the square root of two.

4. Apparatus according to claim 1 wherein said concavely sloping reflective wall means comprise a pair of opposing longitudinally extending, energy reflecting and guiding surface means.

5. Apparatus according to claim 4 wherein said transmission means has an optical axis; said field of acceptance includes an angular acceptance; termini of said reflective wall means at said inlet define a longitudinally extending energy inlet having lateral edges; said energy trap means comprises a longitudinally extending energy outlet substantially co-planar with said energy inlet and having lateral edges; the profile curve of each said reflecting and guiding surface means is parabolic, having as its parabolic focus an opposing lateral edge of said energy outlet and as its parabolic axis a line forming an angle with said optical axis quantitatively equal to said angular acceptance; and the field of acceptance of said transmission means, when expressed in terms of optical direction cosines, is an ellipse of semi-minor axis equal to the sine of said angular acceptance and semi-major axis equal to one.

6. Apparatus according to claim 5 wherein the distance separating said energy inlet from said energy outlet is no more than one half the sum of the lateral dimensions of said inlet and outlet multiplied by the cotangent of said angular acceptance.

7. Apparatus according to claim 1 wherein said wall means are substantially conically shaped and define a substantially circular energy inlet and said energy trap means comprises a substantially circular energy outlet which is substantially co-planar with said energy inlet.

8. Apparatus according to claim 7 wherein said transmission means has an optical axis; said field of acceptance has an angular acceptance; the profile curve of said reflective wall means is parabolic, having as a parabolic focus an opposing edge of said outlet and having as a parabolic axis a line forming an angle with said optical axis equal to said angular acceptance; and the field of acceptance of said transmission means, expressed in optical direction cosines is a right circular cone.

9. Apparatus according to claim 1 wherein said energy trap means is external to said transmission means.

10. Apparatus according to claim 1 wherein said energy trap means comprises means for converting radiant energy into electrical energy.

11. Apparatus according to claim 1 further comprising a plurality of said transmission means.

12. Apparatus according to claim 1 wherein said energy inlet is optically coupled with a medium of refractive index identical to the medium external to said transmission means and comprising said reflective wall means.

13. Radiant energy transmission apparatus for use in an external radiant energy transmitting medium and operative in an emitting mode, said apparatus comprising:
transmission means including, (a) substantially concavely sloping radiant energy reflective wall means for guiding radiant energy, said wall means comprising means defining an energy outlet, (b) means, including said energy outlet, for defining a field of emission for radiant energy, and (c) radiant energy refractive internal medium, said reflective wall means comprising an interface between said refractive internal medium and said external radiant energy transmitting medium, and said internal medium having a higher index of refraction for radiant energy than said external medium;

and radiant energy source means operatively associated with said reflective wall means for emitting radiant energy guided by said wall means, said concavely sloping, reflective wall means including reflective means having a profile curve sloped to assume the maximum possible slope consistent with totally internally reflecting all energy rays from said energy source means through said energy outlet within said field of emission.

14. Apparatus according to claim 13 wherein said refractive internal medium is of substantially uniform refractive index.

15. Apparatus according to claim 13 wherein the ratio of the refractive index of said internal medium to said external medium is at least the square root of two.

16. Apparatus according to claim 13 wherein said concavely sloping reflective wall means comprise a pair of opposing longitudinally extending, energy reflecting and guiding surface means.

17. Apparatus according to claim 16 wherein said transmission means has an optical axis; said field of emission includes an angular emission; termini of said reflective wall means at said outlet define a longitudinally extending energy outlet having lateral edges; said energy source means comprises a longitudinally extending energy source substantially co-planar with said energy outlet and having lateral edges; the profile curve of each said reflecting and guiding surface means is parabolic, having as its parabolic focus an opposing lateral edge of aid energy inlet and as its parabolic axis a line forming an angle with said optical axis quantitatively equal to said angular emission; and the field of emission of said transmission means, when expressed in terms of optical direction cosines, is an ellipse of semi-minor axis equal to the sine of said angular emission and semi-major axis equal to one.

18. Apparatus according to claim 17 wherein the distance separating said energy inlet from said energy outlet is no more than one half the sum of the lateral dimensions of said inlet and outlet multiplied by the cotangent of said angular acceptance.

19. Apparatus according to claim 13 wherein said wall means are substantially conically shaped and define a substantially circular energy outlet and wherein said energy trap means comprises a substantially circular energy inlet which is substantially co-planar with said energy outlet.

20. Apparatus according to claim 19 wherein said transmission means has an optical axis; said field of emission has an angular emission; the profile curve of said reflective wall means is parabolic, having as a parabolic focus an opposing edge of said inlet and having as a parabolic axis a line forming an angle with said optical axis equal to said angular emission; and the field of emission of said transmission means, expressed in optical direction cosines is a right circular cone.

21. Apparatus according to claim 13 wherein said energy source means is external to said transmission means.

22. Apparatus according to claim 13 wherein said energy source means comprises means for converting electrical energy into radiant energy.

23. Apparatus according to claim 13 further comprising a plurality of said transmission means.

24. Apparatus according to claim 13 wherein said energy outlet is optically coupled with a medium of refractive index identical to the medium external to said transmission means and comprising said reflective wall means.

* * * * *